(12) United States Patent
Schattleitner et al.

(10) Patent No.: US 8,896,419 B2
(45) Date of Patent: Nov. 25, 2014

(54) METHOD FOR INSPECTING A PRODUCT AS AN ORIGINAL PRODUCT OF A PRODUCT PRODUCER

(75) Inventors: Angela Schattleitner, Tuntenhausen (DE); Hermann Seuschek, München (DE)

(73) Assignee: Siemens Aktiengesellschaft, Munich (DE)

( * ) Notice: Subject to any disclaimer, the term of this patent is extended or adjusted under 35 U.S.C. 154(b) by 287 days.

(21) Appl. No.: 13/393,306

(22) PCT Filed: Jun. 16, 2010

(86) PCT No.: PCT/EP2010/058454
§ 371 (c)(1),
(2), (4) Date: Feb. 29, 2012

(87) PCT Pub. No.: WO2011/026665
PCT Pub. Date: Mar. 10, 2011

(65) Prior Publication Data
US 2012/0154111 A1    Jun. 21, 2012

(30) Foreign Application Priority Data
Sep. 2, 2009 (DE) .......................... 10 2009 039 823

(51) Int. Cl.
*G05B 23/00* (2006.01)
*G06Q 10/08* (2012.01)

(52) U.S. Cl.
CPC ..................................... *G06Q 10/08* (2013.01)
USPC ........................................................ 340/5.8

(58) Field of Classification Search
CPC ............ H04L 2209/56; H04L 63/0442; H04L 2209/30; G06Q 20/32
USPC .................... 340/5.8, 5.6, 505; 713/168, 171; 455/411
See application file for complete search history.

(56) References Cited

U.S. PATENT DOCUMENTS

| | | | |
|---|---|---|---|
| 8,291,229 B2 | 10/2012 | Vuillaume et al. | 713/176 |
| 8,509,441 B2 * | 8/2013 | Yoon et al. | 380/270 |
| 2004/0066278 A1 | 4/2004 | Hughes et al. | 340/10.1 |
| 2005/0068152 A1 | 3/2005 | Umchara et al. | 340/5.8 |
| 2006/0235805 A1 * | 10/2006 | Peng et al. | 705/76 |

FOREIGN PATENT DOCUMENTS

| | | | |
|---|---|---|---|
| EP | 1821236 A2 | 8/2007 | G06K 7/00 |
| EP | 2081353 A2 | 7/2009 | H04L 29/06 |
| JP | 2003-196360 A | 7/2003 | G06K 17/00 |

(Continued)

OTHER PUBLICATIONS

Sarma, Sanjay E., et al., "RFID Systems and Security and Privacy Implications", Parallel and Distributed Processing and Applications: Second International Symposium, ISPA 2004 Proceedings, vol. 2523, pp. 454-469, Dec. 13, 2004.

(Continued)

*Primary Examiner* — Vernal Brown
(74) *Attorney, Agent, or Firm* — King & Spalding L.L.P.

(57) ABSTRACT

Against the background of continually growing problems of product piracy, in particular due to the further expansion and liberalization of international trade, there is great demand for automated and reliable inspection of the authenticity of products. Thus, methods and systems are provided for inspecting a product as an original product of a product producer by authenticating at least one RFID (Radio Frequency Identification) tag allocated to the product using an asymmetrical challenge response protocol.

12 Claims, 3 Drawing Sheets

(56) References Cited

FOREIGN PATENT DOCUMENTS

| JP | 2008-177928 A | 7/2008 | H04M 1/57 |
| JP | 2009-171292 A | 7/2009 | G09C 1/00 |
| WO | 2009/095143 A1 | 8/2009 | H04L 9/30 |

OTHER PUBLICATIONS

Mingyan, Li, et al., "Multi-Domain RFID Access Control Using Asymmetric Key Based Tag-Reader Mutual Authentication", 26$^{th}$ International Congress of the Aeronautical Sciences, 5 pages, Sep. 14, 2008.

Falk, Rainer, et al., "Simulating a Multi-Domain RFID System for Replacement Part Tracking", 2009 Third International Conference on Emerging Security Information, Systems, and Technologies, pp. 197-201, Jun. 18, 2009.

German Search Report, German Patent Application No. 10 2009 039 823.6-53, 8 pages, May 10, 2010.

International PCT Search Report and Written Opinion, PCT/EP2010/058454, 20 pages, Oct. 27, 2010.

Japanese Office Action, Application No. 2012-527253, 6 pages (German), Jul. 9, 2013.

\* cited by examiner

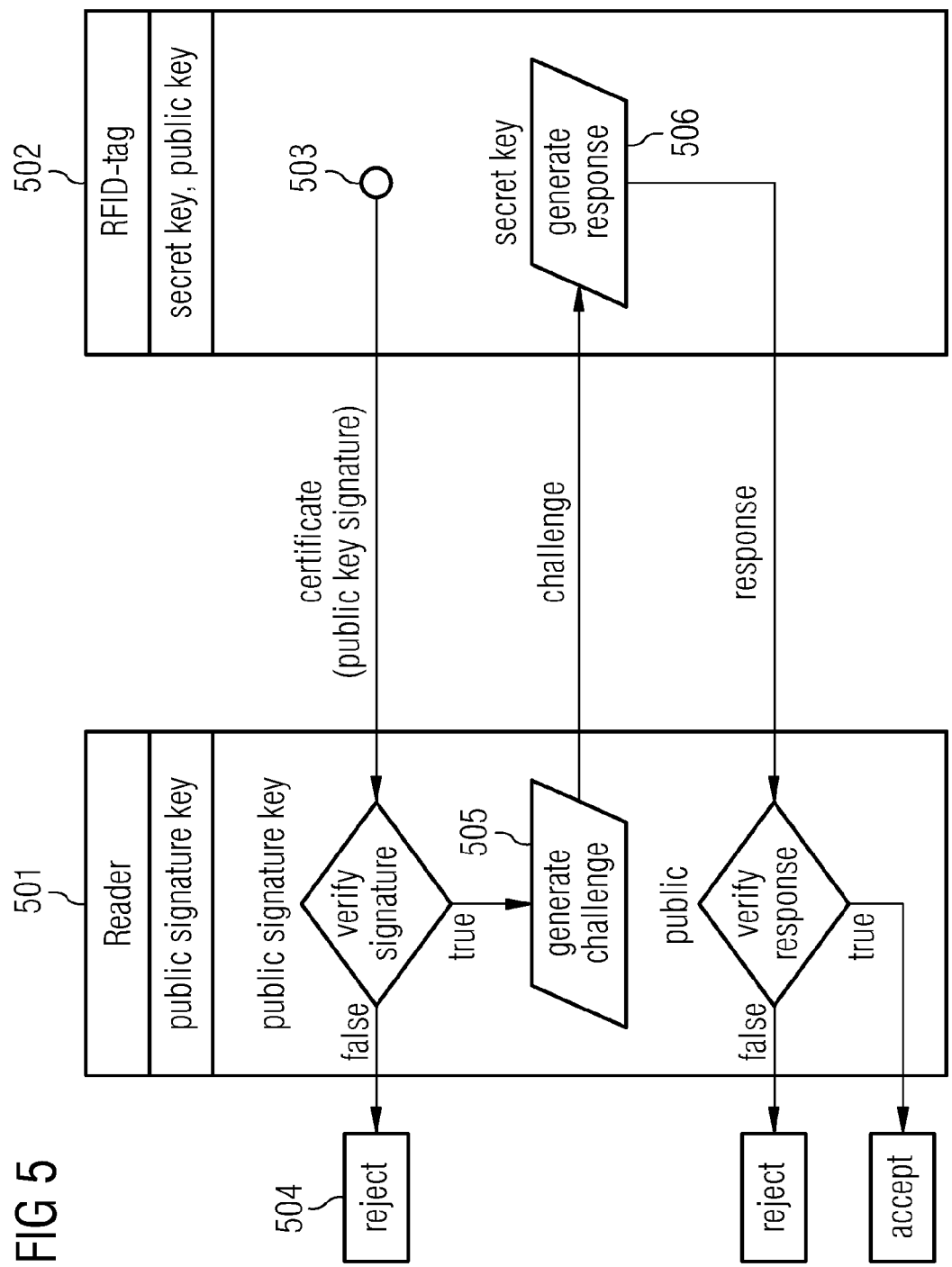

METHOD FOR INSPECTING A PRODUCT AS AN ORIGINAL PRODUCT OF A PRODUCT PRODUCER

CROSS-REFERENCE TO RELATED APPLICATIONS

This application is a U.S. National Stage Application of International Application No. PCT/EP2010/058454 filed Jun. 16, 2010, which designates the United States of America, and claims priority to DE Patent Application No. 10 2009 039 823.6 filed Sep. 2, 2009. The contents of which are hereby incorporated by reference in their entirety.

TECHNICAL FIELD

This disclosure relates to a method and a system for inspecting a product as an original product of a product producer by authenticating at least one RFID (Radio Frequency Identification) tag assigned to the product using an asymmetrical challenge response protocol.

BACKGROUND

When inspecting incoming goods, incoming goods usually undergo an acceptance inspection, in which the product supplied is checked for quantity and quality. This is done either by random sampling or by inspecting the whole consignment of incoming goods. The same applies in principle to customs controls, in which a comparison of goods to be imported and exported is carried out with the customs declaration.

In the case of packs equipped with RFID tags, there is the option of carrying out an automated check with the aid of an RFID reader instead of a manual physical check. As a result thereof, it is possible to inspect a number of packs in a short time (that is, by bulk reading).

In the context of an automated quantity and quality check of such a kind, no distinction is made between genuine and counterfeit products, however. Against a backdrop of continually increasing problems with product piracy, and also in particular as a result of the further expansion and liberalization of international trade, an automated and reliable inspection of the authenticity of products would be extremely desirable.

SUMMARY

In one embodiment, a method is provided for inspecting a product as an original product of a product producer by authenticating at least one RFID (Radio Frequency Identification) tag assigned to the product, using an asymmetrical challenge response protocol. The method may include reading a product code from the RFID tag, detecting an electronic delivery note assigned thereto, generating a challenge based on a random number, transmitting the challenge wirelessly to the RFID tag, detecting a response by means of the RFID tag based on the challenge that has been transmitted and on a first secret key that is assigned to the RFID tag, verifying the response that has been established to determine an authentication result, and importing the authentication result into the electronic delivery note.

In a further embodiment, a digital certificate encompassing the public key is stored on the RFID tag, and the digital certificate is read and the authenticity of the digital certificate is verified. In a further embodiment, the public key can be ascertained from the electronic delivery note.

In another embodiment, a system for inspecting a product as an original product of a product producer by authenticating at least one RFID (Radio Frequency Identification) tag assigned to the product, using an asymmetrical challenge response protocol as disclosed herein. The system may include an RFID reader with a first communications module for wireless communication with the RFID tag, the RFID-tag with an authentication module that determines an appropriate response to a challenge that has been received, and a second communications module for wireless communication with the RFID reader, and a second authentication module to generate a challenge and verify a response and an RFID middleware to provide electronic delivery notes.

In a further embodiment, the RFID reader is permanently connected to the RFID middleware, the electronic delivery notes are provided to the RFID reader when requested. In a further embodiment, the RFID reader is connectable to the RFID middleware, and where a connection exists, electronic delivery notes are provided to the RFID reader. In a further embodiment, the second authentication module is assigned to the RFID reader. In a further embodiment, the second authentication module is assigned to the RFID middleware.

BRIEF DESCRIPTION OF THE DRAWINGS

Example embodiments will be explained in more detail below with reference to figures, in which:

FIG. 5 shows an example flow diagram for a challenge response protocol for authenticity verification according to the certain embodiments.

DETAILED DESCRIPTION

Figure 1:
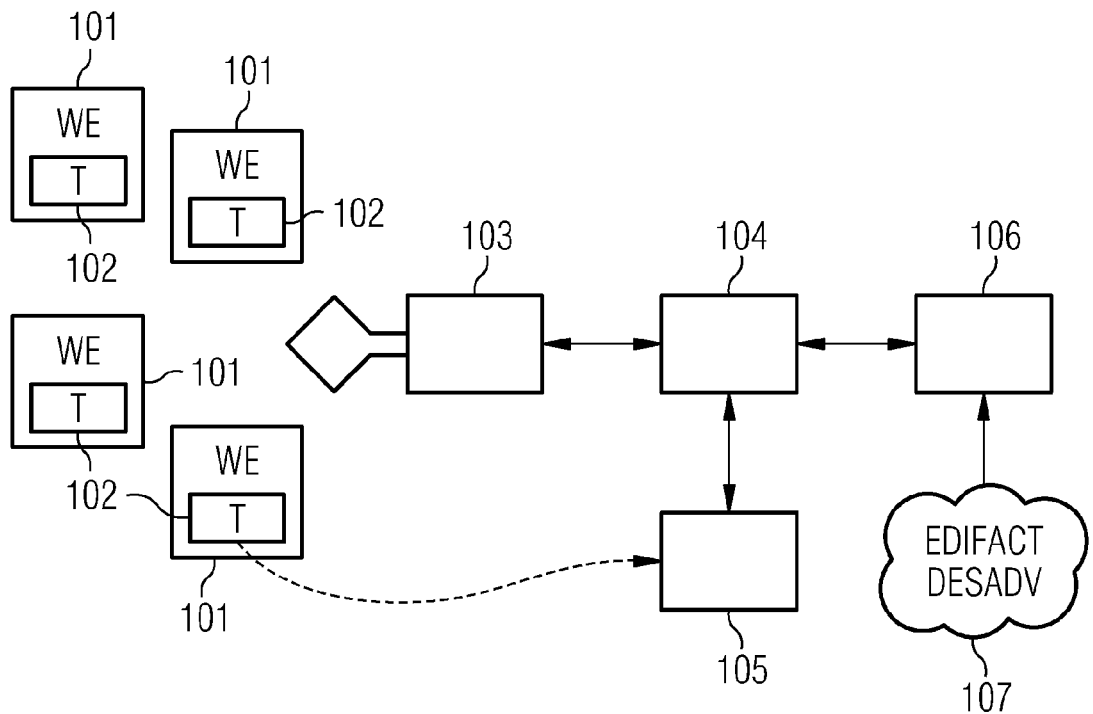
FIG. 1 shows a schematic diagram of system components of a product inspection system according to a first example embodiment.

Some embodiments provide a method for the automated inspection of products when taking delivery or during customs controls, with which method the authenticity of the products may be reliably checked.

For example, certain embodiments provide a method for inspecting a product as an original product of a product producer authenticates at least one RFID tag assigned to the product using an asymmetrical challenge response protocol. First a product code is read off the RFID tag and an electronic delivery note assigned thereto is detected. A challenge based on a random number is subsequently generated and transmitted to the RFID tag in a wireless manner. The RFID tag detects a response on the basis of the challenge that has been transmitted and using a first secret key that is assigned to the RFID tag. The response detected is checked to determine an authentication result and the authentication result is recorded in the electronic delivery note.

Some embodiment include equipping RFID tags for a product with a private PKI (Private Key Infrastructure) key and irreversibly connecting the key to the product. The electronic delivery note or the electronic customs declaration contains the corresponding data set for the authentication of the RFID tag (that is, the Public Key). In this way, the authenticity of the product may be advantageously verified using cryptographic methods.

Advantageously, the proposed piracy protection check may be seamlessly integrated into existing business procedures. Thus, during the acceptance check, the piracy protection check may be carried out at the same time. The current delivery status for the product is shown in the merchandise management system. This information can provide additional support for a quality management process.

In certain embodiments, a digital certificate encompassing the public key may be stored on the RFID tag. The digital certificate may be read and the authenticity of the digital certificate verified.

In some embodiments, the private key and a digital certificate assigned thereto are stored on the RFID tag that is to be verified. The digital certificate may encompass the public key, additional information and a digital signature. Reading of the private key may be prevented by hardware measures. The digital certificate on the other hand can be read. Prior to verification of authenticity, it is read by an RFID reader and transmitted to a verification unit, where the authenticity of the digital certificate is verified with the aid of the digital signature. When the digital certificate has been verified, the RFID tag is checked by using an asymmetrical challenge response protocol as disclosed herein, the presence of the private key being verified with the aid of the public key, without the private key having to be read.

In some embodiments, the public key can be ascertained from the electronic delivery note. In this variant, the digital certificate is not stored on the RFID tag but is recorded in the electronic delivery note for each product unit. In this variant the digital certificate is not imported by the RFID tag but is taken from the electronic delivery note.

Some embodiments provide a system according for inspecting a product as an original product of a product producer by authenticating at least one RFID tag assigned to the product using an asymmetrical challenge response protocol as disclosed herein. The system may comprise an RFID reader with a communications module for wireless communication with the RFID tag. It may further comprises an RFID tag with an authentication module that determines an appropriate response to a challenge that has been received, and a second communications module for wireless communication with the RFID reader. Furthermore, a second authentication module may be provided to generate a challenge and verify a response. Finally, an RFID middleware provides electronic delivery notes.

The integration of the authenticity verification of products into the general business process leads to improved piracy protection since verification is carried out at critical points in the materials flow system. The proposed measures mean that the piracy inspection can be carried out very efficiently. Furthermore, counterfeits can be detected at an early stage and do not have to be accepted from the supplier in the first place. This creates a considerable savings potential while at the same time increasing the quality.

FIG. 1 shows system components of an example system according to certain embodiments. The product units 101 that are shown are located, for example, at an incoming goods inspection point or a customs clearance point. For the authenticity verification, the product units 101 are each equipped with an RFID tag 102. The RFID tags 102 are able to communicate with an RFID reader 103. This RFID reader 103 is permanently connected via a suitable interface to an RFID middleware 104. The RFID middleware 104 is again connected to a piracy protection unit 105. Moreover, the RFID middleware 104 has access to a merchandise management system 106, via which there is access to the electronic delivery notes 107.

The RFID middleware 104, the piracy protection unit 105 and the merchandise management system 106 may be located in a secure environment. Since the RFID tags 102 are authenticated with the piracy protection unit 105, the RFID reader 103 does not necessarily have to be authenticated with the RFID middleware 104. The authentication of the RFID tag 102 is carried out using a challenge response authentication protocol. The merchandise management system 106 verifies the data from the electronic delivery notes against the RFID data. An indication of the presence of counterfeits or of an error in the order delivery can be generated on the RFID reader 103 or on a terminal in the merchandise management system 106.

Figure 2:
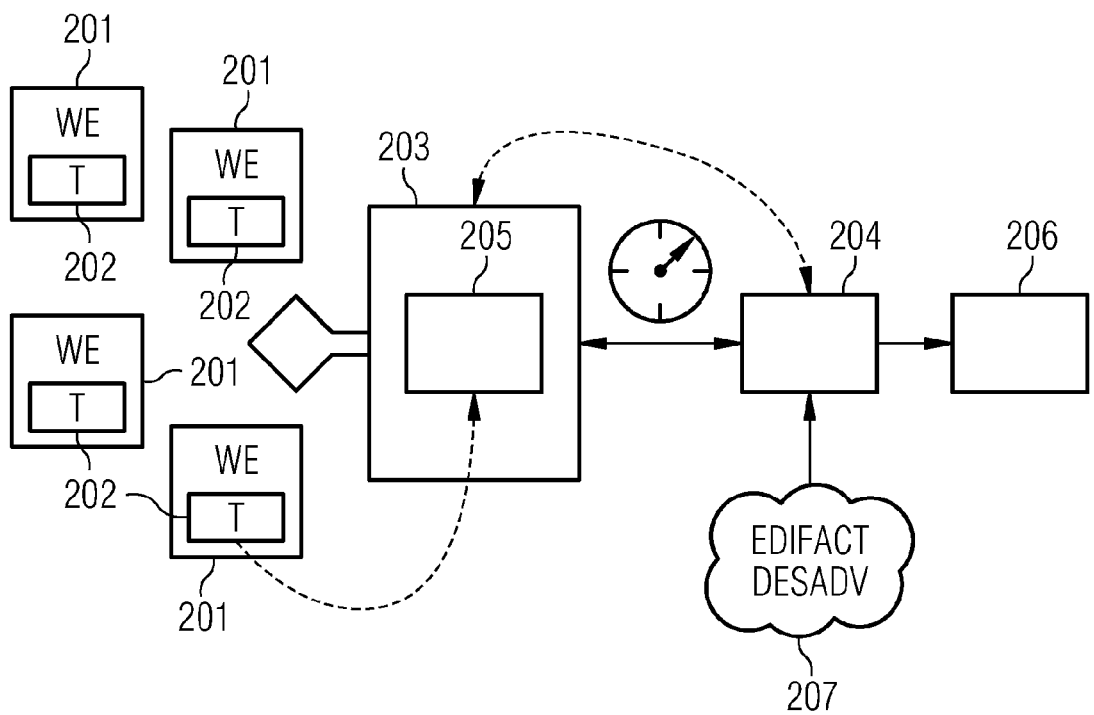
FIG. 2 shows a schematic diagram of system components of a product inspection system according to a second example embodiment.

For many applications there is no permanent availability of an online connection between the RFID reader and the RFID middleware. Such a scenario is shown in FIG. 2. In this case, inspection of the incoming goods 201 may be carried out offline. If a connection is established again with the RFID middleware 204, the data can be compared after a time lag.

In some embodiments, the electronic delivery notes are available before the products are delivered. An electronic delivery note 207 is transmitted to the RFID middleware 204 where it is buffer-stored. If an RFID reader 203 connects to the middleware 204, the electronic delivery notes 207 that have not yet been processed are forwarded to the RFID reader 203 and stored there.

The RFID reader 203 now detects the incoming goods 201 offline and compares the items with the electronic delivery note. The authenticity verification of the products is achieved with the aid of an authentication method, using the RFID tag 202. In the present embodiment, the piracy protection unit 205 is located in the RFID reader 203. If a product unit 201 has been recognized as authentic, the data set in the electronic delivery note is digitally signed using the private key pertaining to the RFID reader. The digital signature is appended to the delivery note as an additional attribute.

Subsequent to the incoming goods inspection, a delivery note with additional attributes for authenticity verification and for incoming goods has been stored in the mobile RFID reader 203. Said extended delivery note is passed on to the merchandise management system 206 when the next connection is established with the RFID middleware 204. The incoming product is then recorded in the merchandise management system 206 and an electronic incoming goods receipt is issued, for example.

Two example standards that offer appropriate structures for the design of an electronic delivery note with the corresponding data fields for the additional information per product unit:

UN/EDIFACT (United Nations Electronic Data Interchange for Administration, Commerce and Transport): here the PIA (Additional Product ID) segment pertaining to the LIN (Line Item) segment in the despatch advice (DESADV) could include, for example, the public key or the digital certificate for the authenticity verification. In the electronic customs declaration (COSDEC), too, in the context of the ATLAS automated customs clearance system, the additional cryptographic data could allow an authenticity verification when goods are imported.

OpenTrans: here, in the dispatch notification, the Remark Element for a dispatch notification item could contain the public key material or the digital certificate.

Two example methods for asymmetrical key management in the authenticity verification of the RFID tags are discussed below.

Figure 3:
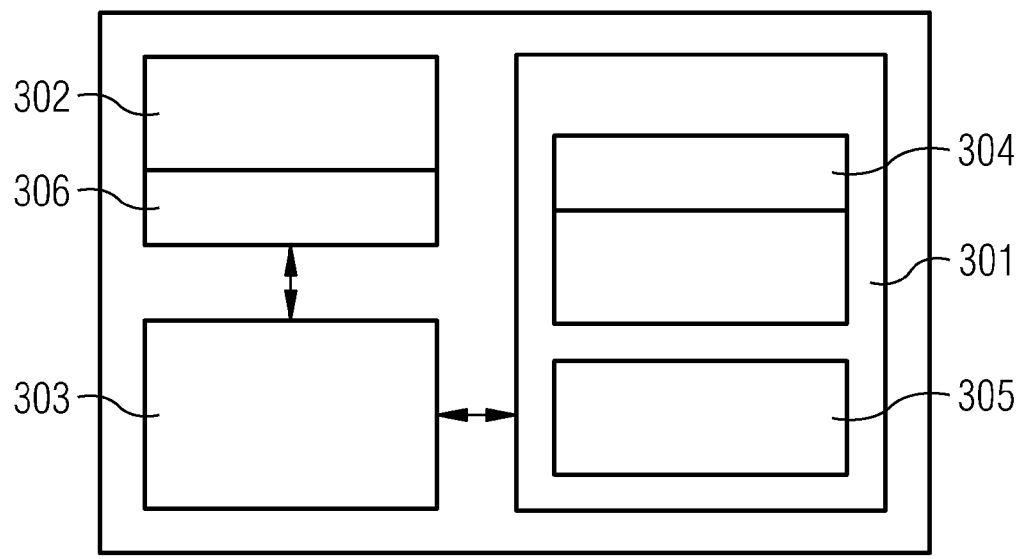
FIG. 3 shows a block diagram showing functional blocks of an RFID tag according to a first example embodiment.

A first example embodiment is illustrated in FIG. 3, which shows an RFID tag with a memory 301, an authentication module 302, together with a private key 306 and a communications module 303. Here the digital certificate 304 is stored in the memory 301 of the RFID tag. In addition to a product code 305, the RFID tag consequently also stores an appropriate certificate 304 encompassing the public key, additional information and a digital signature. Reading of the private key 306 is prevented by hardware measures. The digital certificate can be read and, prior to authenticity verification, it is read by the RFID reader and transmitted to the piracy protection unit via the RFID middleware, for example. The authenticity of the digital certificate is checked in the piracy protection unit using the digital signature. When the digital certificate has been verified, the RFID tag is checked, using the asymmetrical challenge response protocol. The presence of the private key is checked with the aid of the public key, without the private key having to be read.

Figure 4:
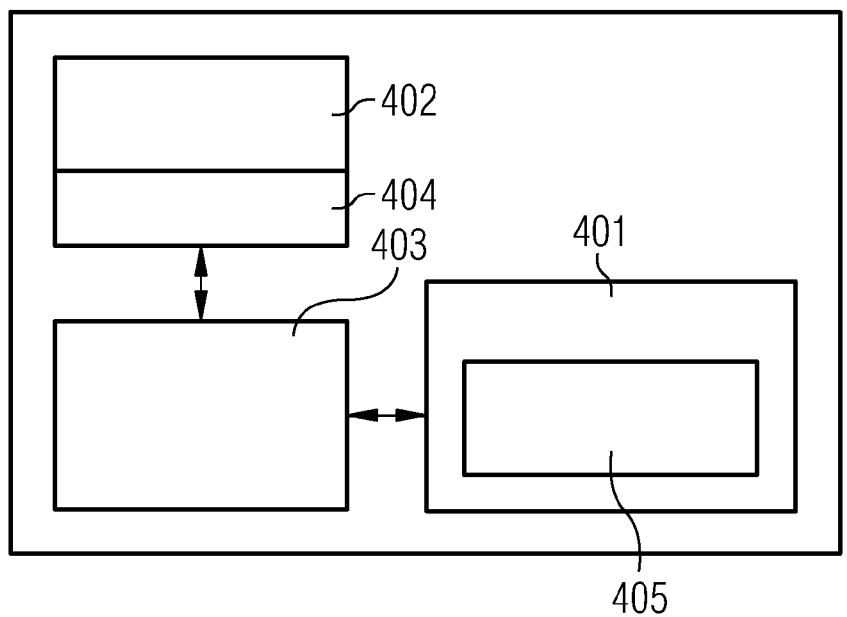
FIG. 4 shows a block diagram showing functional blocks of an RFID tag according to a second example embodiment.

A second example embodiment is illustrated in FIG. 4, which shows an RFID tag with a memory 401, an authentication module 402, together with a private key 404 and a communications module 404. The product code 405 is obtainable via the memory 401 of the RFID tag.

In this variant, the digital certificate is not stored on the RFID tag but is recorded in the electronic delivery note for each product unit. Authenticity verification functions as in the previous variant, but the difference is that the digital certificate is not imported by the RFID tag, but can be determined from the electronic delivery note.

FIG. 5 shows an example flow diagram for an authentication protocol between an RFID reader 501 and an RFID tag 502, according to an example embodiment. In this embodiment, the digital certificate is stored on the RFID tag 502. In the first step 503, the RFID reader 501 reads the digital certificate off the RFID tag 502. The digital certificate encompasses at least the public key and a digital signature. The RFID reader 501 verifies the digital signature and hence the digital certificate with the aid of a public signature key. If the result of the verification is negative 504, the RFID tag is not authenticated. However, if the result of the verification is positive 505, a challenge based on the public key is generated by the RFID reader 501 and transmitted to the RFID tag. The RFID tag 502 in turn generates a response 506 based on the challenge that has been received and on the secret key. This response is read by the RFID reader 501. With the aid of the public key pertaining to the RFID tag 501, the RFID reader 501 verifies the response that has been received. If the result of the verification is negative, the RFID tag 501 is not authenticated 507. If the result of the verification is positive, the RFID tag 501 is authenticated by the RFID reader.

Any of the disclosed methods or systems for protection against piracy may also be used in the context of electronic customs clearance (i.e. ATLAS, the German automated tariff and local customs clearance system). In this way the distribution of counterfeit products across borders can be prevented in a targeted manner.

What is claimed is:

1. A method for authenticating a product using an asymmetrical challenge response protocol, comprising:
   reading a digital certificate wirelessly transmitted by a Radio Frequency Identification (RFID) tag associated with a product, the digital certificate comprising a public key,
   accessing an electronic delivery note assigned to the RFID tag or to the product,
   generating a challenge based on the public key,
   transmitting the challenge wirelessly to the RFID tag,
   receiving wirelessly from the RFID tag a response to the challenge, the response being generated by the RFD tag based on a secret key that assigned to the RFID tag,
   verifying the response received from the RFID tag to determine an authentication result, and
   associating the authentication result with the electronic delivery note assigned to the RFID tag or to the product.

2. The method of claim 1, further comprising determining the public key from the accessed electronic delivery note, and generating the challenge based on the public key determined from the electronic delivery note.

3. The method of claim 1, wherein the challenge is generated based on a random number.

4. The method of claim 1, wherein associating the authentication result with the electronic delivery note comprises importing the authentication result into the electronic delivery note.

5. A Radio Frequency Identification (REID) reader configured to authenticate a product using an asymmetrical challenge response protocol, comprising:
   electronics programmed to:
      read a digital certificate wirelessly transmitted by an RFID tag associated with a product, the digital certificate comprising a public key,
      access an electronic delivery note assigned to the RFID tag or to the product,
      generate a challenge based on the public key,
      transmit the challenge wirelessly to the RFID tag,
      receive wirelessly from the RFID tag a response to the challenge, the response being generated by the RFID tag based on a secret key that assigned to the RFID tag,
      verify the response received from the RFID tag to determine an authentication result, and
      associate the authentication result with the electronic delivery note assigned to the RFID tag or to the product.

6. The RFID reader of claim 5, further comprising electronics programmed to determine the public key from the accessed electronic delivery note, and generate the challenge based on the public key determined from the electronic delivery note.

7. The RFID reader of claim 5, wherein the challenge is generated based on a random number.

8. The RFID reader of claim 5, wherein associating the authentication result with the electronic delivery note comprises importing the authentication result into the electronic delivery note.

9. A system for authenticating a product using an asymmetrical challenge response protocol, comprising:
   a Radio Frequency Identification (RFID) tag associated with a product, the RFID tag storing a digital certificate comprising a public key, and a secret key that assigned to the RFID tag; and
   a Radio Frequency Identification (RFID) reader comprising electronics configured to:
      wirelessly receive the digital certificate from the RFID tag,
      access an electronic delivery note assigned to the RFID tag or to the product,
      generate a challenge based on the public key,
      transmit the challenge wirelessly to the RFID tag, wirelessly receive from the RFID tag a response to the challenge, the response being generated by the RFID tag based on the secret key assigned to the RFID tag, verify the response received from the RFID tag to determine an authentication result, and associate the authentication result with the electronic delivery note assigned to the RFID tag or to the product.

10. The system of claim 9, wherein the RFID reader comprises electronics configured to determine the public key from the accessed electronic delivery note, and generate the challenge based on the public key determined from the electronic delivery note.

11. The system of claim 9, wherein the challenge is generated based on a random number.

12. The system of claim 9, wherein associating the authentication result with the electronic delivery note comprises importing the authentication result into the electronic delivery note.

* * * * *